(12) United States Patent
Yamanaka et al.

(10) Patent No.: US 8,979,166 B2
(45) Date of Patent: Mar. 17, 2015

(54) FENDER PANEL MOUNTING STRUCTURE FOR VEHICLE

(71) Applicant: Honda Motor Co., Ltd., Minato-Ku, Tokyo (JP)

(72) Inventors: Hiroki Yamanaka, Tokyo (JP); Masashige Iseki, Wako (JP); Kousuke Katsumata, Wako (JP); Noriaki Masuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/373,141

(22) PCT Filed: Nov. 29, 2012

(86) PCT No.: PCT/JP2012/080915
§ 371 (c)(1),
(2) Date: Jul. 18, 2014

(87) PCT Pub. No.: WO2013/108494
PCT Pub. Date: Jul. 25, 2013

(65) Prior Publication Data
US 2014/0367997 A1     Dec. 18, 2014

(30) Foreign Application Priority Data

Jan. 20, 2012   (JP) ................................. 2012-009802

(51) Int. Cl.
*B60N 99/00*     (2006.01)
*B62D 27/06*     (2006.01)
*B62D 25/16*     (2006.01)

(52) U.S. Cl.
CPC .............. *B62D 27/06* (2013.01); *B62D 25/163* (2013.01); *B62D 25/16* (2013.01)

USPC .. 296/146.15; 296/201; 296/198; 296/193.06

(58) Field of Classification Search
USPC ........................ 296/146.15, 201, 198, 193.06
See application file for complete search history.

(56) References Cited

U.S. PATENT DOCUMENTS

| | | | | |
|---|---|---|---|---|
| 5,772,277 | A * | 6/1998 | Fukuda | 296/201 |
| 7,083,224 | B2 * | 8/2006 | Yamamura et al. | 296/198 |
| 7,651,158 | B2 * | 1/2010 | Koizumi et al. | 296/203.02 |
| 7,845,713 | B2 * | 12/2010 | Terai et al. | 296/193.06 |

FOREIGN PATENT DOCUMENTS

| | | |
|---|---|---|
| JP | S60-89074 A | 6/1985 |
| JP | 3413284 B2 | 6/2003 |

(Continued)

*Primary Examiner* — Joseph D Pape
(74) *Attorney, Agent, or Firm* — Carrier Blackman & Associates, P.C.; Joseph P. Carrier; William D. Blackman

(57) ABSTRACT

A fender panel mounting structure for a vehicle is configured so that a fender panel can be removed without detaching the corner glass of a non-opening window. The fender panel mounting structure has the triangular non-opening window provided between a front pillar and an outside panel. A protrusion covering the upper frame member of the front pillar is formed at the upper edge of the fender panel covering the outer surface of the outside panel. A flange protruding to the inner surface side of the non-opening window from a side edge of the protrusion, the side edge facing the non-opening window, is provided on the protrusion. A clip having a slit extending in the front-rear direction of the vehicle is provided at the opening edge of the non-opening window at a position corresponding to the flange. The flange is engaged in a releasable manner with the slit.

4 Claims, 18 Drawing Sheets

(56) References Cited

FOREIGN PATENT DOCUMENTS

| JP | 3532420 | B2 | 5/2004 |
| JP | 2006-213295 | A | 8/2006 |
| JP | 4140078 | B2 | 8/2008 |
| JP | 4206878 | B2 | 1/2009 |
| JP | 2009-040170 | A | 2/2009 |
| JP | 2009-298185 | A | 12/2009 |

* cited by examiner

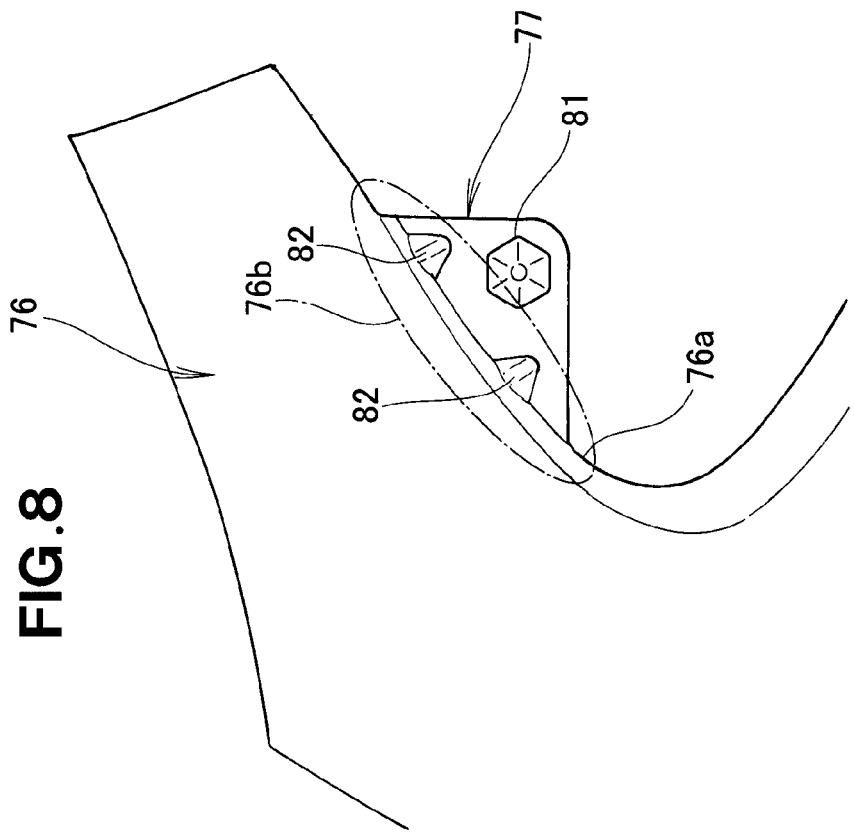
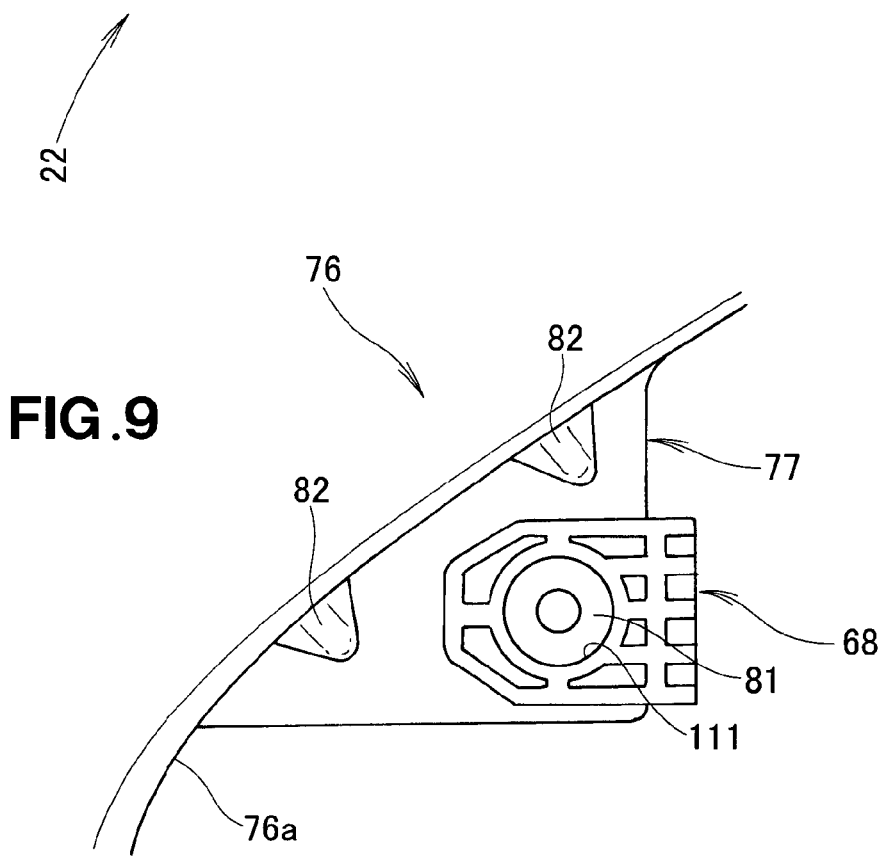

FENDER PANEL MOUNTING STRUCTURE FOR VEHICLE

TECHNICAL FIELD

The present invention relates to a fender panel mounting structure for a vehicle which includes a triangular non-opening window or fixed window mounted to an outside panel, and a fender panel covering an outer surface of the outside panel and having a protrusion formed at an upper edge thereof so as to cover a front pillar.

BACKGROUND ART

A vehicle fender panel mounting structure is disclosed, for example, in Patent Literature 1, which includes an engagement socket formed in a vehicle body, and a pressing member fitted in the engagement socket to thereby press an edge of a fender panel. More specifically, a rubber cushion is used as the pressing member, and a slit is formed in the engagement socket. The rubber cushion includes an insertion part adapted to be inserted into the engagement socket, a projecting guide portion formed on the insertion part for guided engagement with the slit, and elastically deformable pressing parts formed on opposite sides of the guide portion.

According to the vehicle fender panel mounting structure of Patent Literature 1, vibration of the fender panel can be suppressed.

Another vehicle fender panel mounting structure is disclosed, for example, in Patent Literature 2, which includes a fender panel provided to cover a range from a front end of a side part of a vehicle body to a front end of a front door, a front pillar arranged to connect the fender panel and a roof panel, a corner window glass fixed in an opening formed between the fender panel and the front pillar, and a molding member mounted to cover a circumference of the front corner window glass.

According to the vehicle fender panel mounting structure of Patent Literature 2, the fender panel is detachably mounted on the vehicle body. In other words, attachment/detachment performance of the fender panel can be enhanced.

Still another vehicle fender panel mounting structure is disclosed, for example, in Patent Literature 3, in which a fender panel has a rear end part extending in a longitudinal direction of a vehicle body so as to cover a lower half of a front pillar extending in a vertical direction. More specifically, the front pillar is provided with a stepped or recessed portion formed behind a boundary section between the front fender and the front pillar, and the fender panel is provided with a mount piece at an upper edge thereof. The mount piece is fixed to the recessed portion via a bolt fastened from a lateral side of the vehicle body, and a garnish is fitted to cover the recessed portion.

According to the vehicle fender panel mounting structure of Patent Literature 3, mounting operation of the front fender can be performed from the lateral side of the vehicle body without opening a vehicle door.

Yet another vehicle fender panel mounting structure is disclosed, for example, in Patent Literature 4, in which an engagement portion is formed between an outside panel of a vehicle body and a plate mounted on an outer surface of the outside panel, and a clip member has one end fitted in the engagement portion to thereby connect a fender panel and the outside panel. The clip member includes an elastic arm portion projecting laterally outward of the vehicle body to press an edge of the fender panel laterally outward, and restricting portions formed integrally with the elastic arm portion and projecting laterally outward so as to grip the edge of the fender panel from above and below in cooperation with the elastic arm portion.

According to the vehicle fender panel mounting structure of Patent Literature 4, since the edge of the fender panel is gripped by the elastic arm portion and the restricting portions from above and below, the vertical displacement of the edge of the fender panel can be restricted.

Another vehicle fender panel mounting structure is disclosed, for example, in Patent Literature 5, which includes a triangular fixed window mounted between a lower part of a front pillar and a front side body, and a fender panel covering an outer surface of the front side body and having a protrusion formed at a rear end of an upper edge thereof to cover a lower end of the front pillar. The protrusion has a tongue like lock piece projecting from a side edge thereof facing the fixed window toward and along an inner surface of the fixed window. A substantially U-shape notched lock groove is formed in the lock piece, and a clip is provided on an opening edge of the fixed window at a position corresponding to the lock piece.

According to the vehicle fender panel mounting structure of Patent Literature 5, the lock groove of the lock piece is detachably engaged with the clip, and thus attachment/detachment operation of the fender panel can be performed without detaching the fixed window.

Still another vehicle fender panel mounting structure is disclosed, for example, in Patent Literature 6, in which a triangular fixed window is mounted on a side body located forward of a front door. A notch having an acute angle is formed in an upper rear part of a fender panel covering the side body, and an acute angle section of the fixed window is fitted to the notch.

According to the vehicle fender panel mounting structure of Patent Literature 6, a circumference of the notch of the fender panel can be firmly supported from upper and lower sides.

PRIOR ART LITERATURES

Patent Literatures

Patent Literature 1: Japanese Patent Application Laid-Open Publication No. 2006-213295
Patent Literature 2: Japanese Patent No. 4140078
Patent Literature 3: Japanese Patent No. 3532420
Patent Literature 4: Japanese Patent No. 3413284
Patent Literature 5: Japanese Patent No. 4206878
Patent Literature 6: Japanese Patent Application Laid-Open Publication No. 2009-298185

SUMMARY OF INVENTION

Technical Problems

The vehicle fender panel mounting structure disclosed in Patent Literature 1 includes a vehicle front part structure in which a corner window glass is provided forward of a front door window glass to thereby ensuring a good field of vision. The corner window glass is fixedly joined to an outside panel via a sealer or clip. Also, it is required to fix an upper rear part of the fender panel to the outside panel for suppressing vibration of the fender panel.

If a part of the outside panel corresponding to a front pillar is extended forward, the outside panel becomes large in size, which would affect the conveyance thereof. To avoid this, a part of the fender panel is extended rearward so as to form a part corresponding to a lower or front end of the front pillar. As a result, the fender panel has a protrusion at the upper rear part thereof, and it is required to suppress vibration of the protrusion. Conventionally, a foamed material is provided between the protrusion and the outside panel, however, there have been a problem that the foamed material is accumulated on the bottom of a booth during coating.

Further, conventionally, a mount piece or flange provided on the upper rear part of the fender panel is fixed to the outside panel via a bolt. During attachment operation, the flange of the fender panel is fixed to the outside panel, and then the corner window glass is joined to the outside panel. However, during repair and maintenance operation, when detaching the fender panel after manufacturing of the vehicle, the workability is degraded because of the corner window glass mounted outward of a fixing section of the flange in a vehicle width direction (for example, a tool for removing the bolt cannot be inserted).

To clear these problems, in some vehicle fender panel mounting structures, as disclosed in Patent Literatures 2 and 3, a front end part of the corner window glass is cut away, and a garnish is additionally provided outward of the fixing section of the fender panel. Alternatively, in some vehicle fender panel mounting structures, as disclosed in Patent Literatures 1 and 4, the fixing section is arranged so as not to be located inward of the corner window glass. In these prior arts, however, there have been problems that the outer appearance is degraded and the number of components is increased.

Thus, to overcome these problems, in some vehicle fender panel mounting structures, as disclosed in Patent Literatures 5 and 6, a U-shaped lock groove is formed in the flange extending from the upper rear part of the fender panel, and a clip for engagement with the lock groove is mounted on the outside panel. With this arrangement, during repair and maintenance operation of the fender panel, the fender panel can be detached by sliding the fender panel with the clip being left on the outside panel. Further, during replacement operation of the fender panel, the fender panel can be attached by locking the fender panel to the clip on the outside panel, the clip being arranged inward of the corner window glass.

In these prior arts, however, there have been problems that a plurality of times of replacement operation might cause breakage of the clip, and that a backlash of the clip is likely to be generated which would cause vibration and noise. Further, when engaging the clip with the U-shaped lock groove, the flange is easily deformed and the engagement operation cannot be performed smoothly.

It is therefore a first object of the present invention to provide a vehicle fender panel mounting structure which allows a fender panel to be easily detached without detaching a corner window glass even when the corner window glass is mounted outward of a fixing section of the fender panel.

It is a second object of the present invention to provide a vehicle fender panel mounting structure which is capable of suppressing vibration and noise generated from a protrusion of the fender panel without using a formed material.

Furthermore, it is a third object of the present invention to provide a vehicle fender panel mounting structure which is free from breakage even if the fender panel is replaced a plurality of times, ensuring easy positioning capability and good workability.

Solutions to Problems

According to the invention as defined in claim 1, there is provided a vehicle fender panel mounting structure comprising: a triangular fixed window mounted between a lower part of a front pillar and an outside panel; and a fender panel covering an outer surface of the outside panel and having a protrusion formed at an upper edge thereof so as to cover a lower end of the front pillar, wherein the protrusion has a flange extending from a side edge thereof facing the fixed window toward and along an inner surface of the fixed window, wherein the fixed window has an opening edge provided with a clip having a slit formed at a position corresponding to the flange and extending in a longitudinal direction of a vehicle, and wherein the flange is detachably engaged with the slit of the clip to thereby lock the protrusion to the opening edge of the fixed window.

Preferably, as defined in claim 2, the flange has a projection formed on an engagement part for engagement with the clip and projecting outward in a vehicle width direction, and the clip has an opening for engagement with the projection, whereby the projection of the flange and the opening of the clip are engaged with each other.

Preferably, as defined in claim 3, the opening edge of the fixed window has a recess formed on a front part thereof to bulge inward in a vehicle width direction at a position facing the inner surface of the fixed window, and the clip is fitted into the recess so that the flange is engaged with the clip.

Preferably, as defined in claim 4, the flange has a reinforcing bead formed thereon adjacent to a base of the protrusion.

Advantageous Effects of Invention

In the invention as defined in claim 1, the vehicle includes the triangular fixed window located below the front pillar and joined to the outside panel, and the fender panel covering the outer surface of the outside panel and having the protrusion formed at a rear end of the upper edge thereof so as to cover the lower end of the front pillar. The protrusion has the flange extending toward and along the inner surface of the fixed window, and the fixed window has the opening edge provided with the clip having the slit formed at the position corresponding to the flange and extending in the longitudinal direction of the vehicle. The flange is detachably engaged with the slit of the clip to thereby lock the protrusion to the opening edge of the fixed window. Since a fixing section of the protrusion can thus be arranged inward of the fixed window, there is no need to provide an additional member such as a garnish. The fixing section can be made invisible by applying, for example, black ceramic coating on a periphery of the fixed window, and an improved outer appearance can thus be obtained. Further, the protrusion can be easily fixed without causing breakage of the clip even if the fender panel is replaced a plurality of times, and thus the work efficiency can be improved. The protrusion can be securely fixed in this manner without using a formed material, so that vibration and noise generated from a vicinity of the protrusion can be suppressed.

In the invention as defined in claim 2, the flange has the projection projecting outward in the vehicle width direction, and the clip has the opening for engagement with the projection. By thus configuring the projection of the flange and the opening of the clip to be engaged with each other, when fixing the fender panel, a restriction in the longitudinal direction, the width direction, and a vertical direction of the vehicle can be realized at a single section, thereby ensuring easy positioning capability and good fitting stability. As a result, the protrusion of the fender panel can be fixed more easily, and thus the work efficiency can be further improved. Since the fender panel can be securely fixed in this manner, vibration and noise generated from the vicinity of the protrusion can be further suppressed.

In the invention as defined in claim 3, the opening edge of the fixed window has the recess formed on the front part thereof, and the clip is fitted into the recess. Thus, the protrusion can be fixed more easily with no fear that the clip would be turned or displaced by traveling vibration and the like. As a result, it is possible to further improve the work efficiency, while further suppressing vibration and noise generated from the vicinity of the protrusion.

In the invention as defined in claim 4, since the flange has the reinforcing bead formed thereon adjacent to the base of the protrusion, the flange can be prevented from being vibrated by traveling vibration and the like, and thus vibration and noise generated from the vicinity of the protrusion can be further suppressed. Moreover, during repair operation of the fender panel, the protrusion can be fixed more easily, and thus the work efficiency can be further improved.

BRIEF DESCRIPTION OF DRAWINGS

FIG. 8 is an enlarged view of section 8 of FIG. 6;

FIG. 9 is a side view of the fender panel shown in FIG. 2 in a state of being engaged with a the clip;

DESCRIPTION OF EMBODIMENTS

Certain preferred embodiments of the present invention will be described in detail below with reference to the accompanying drawings.

Embodiment 1

Figure 1:
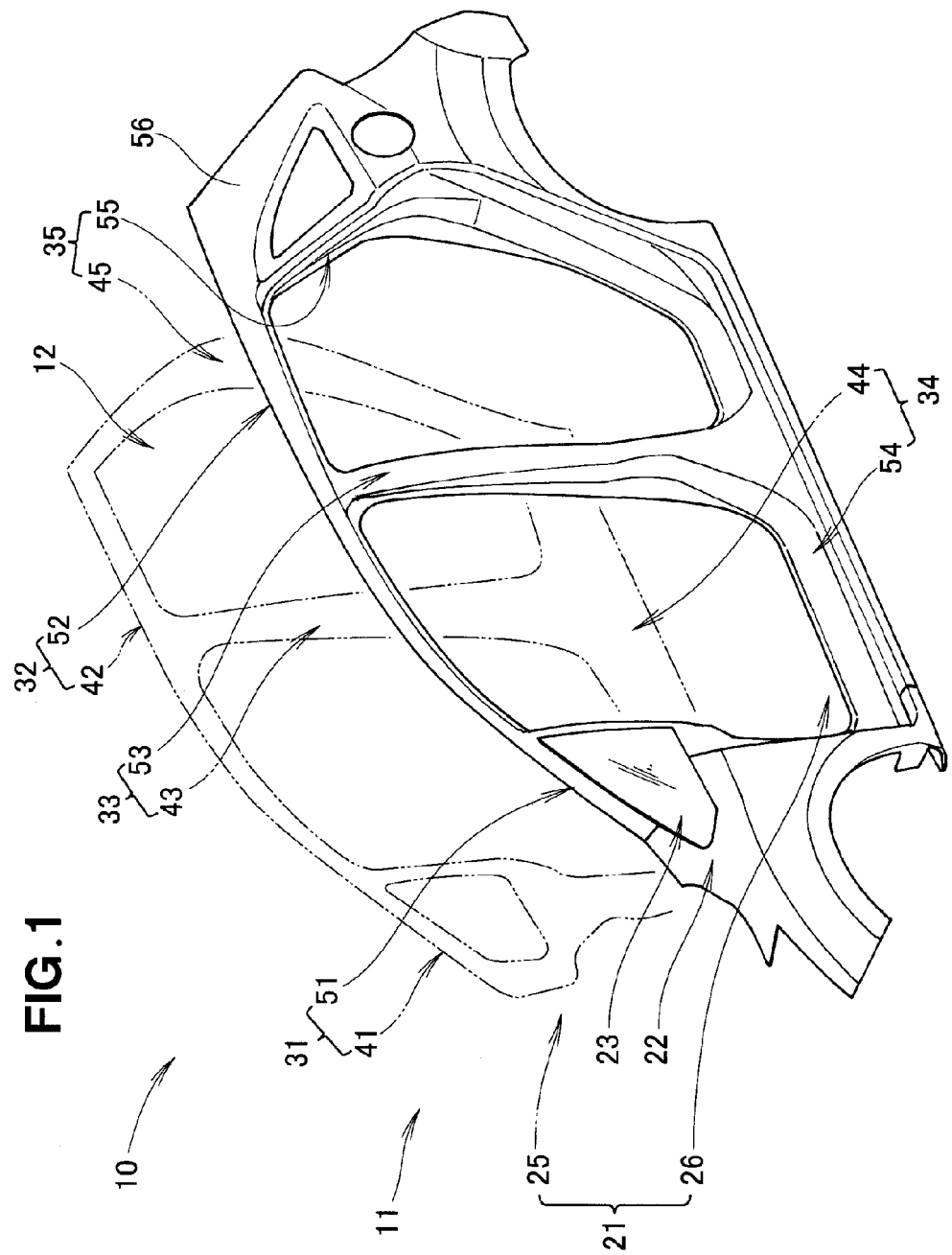
FIG. 1 is a perspective view of a vehicle employing a vehicle fender panel mounting structure according to the present invention, as viewed from a lateral side of the vehicle.
Figure 2:
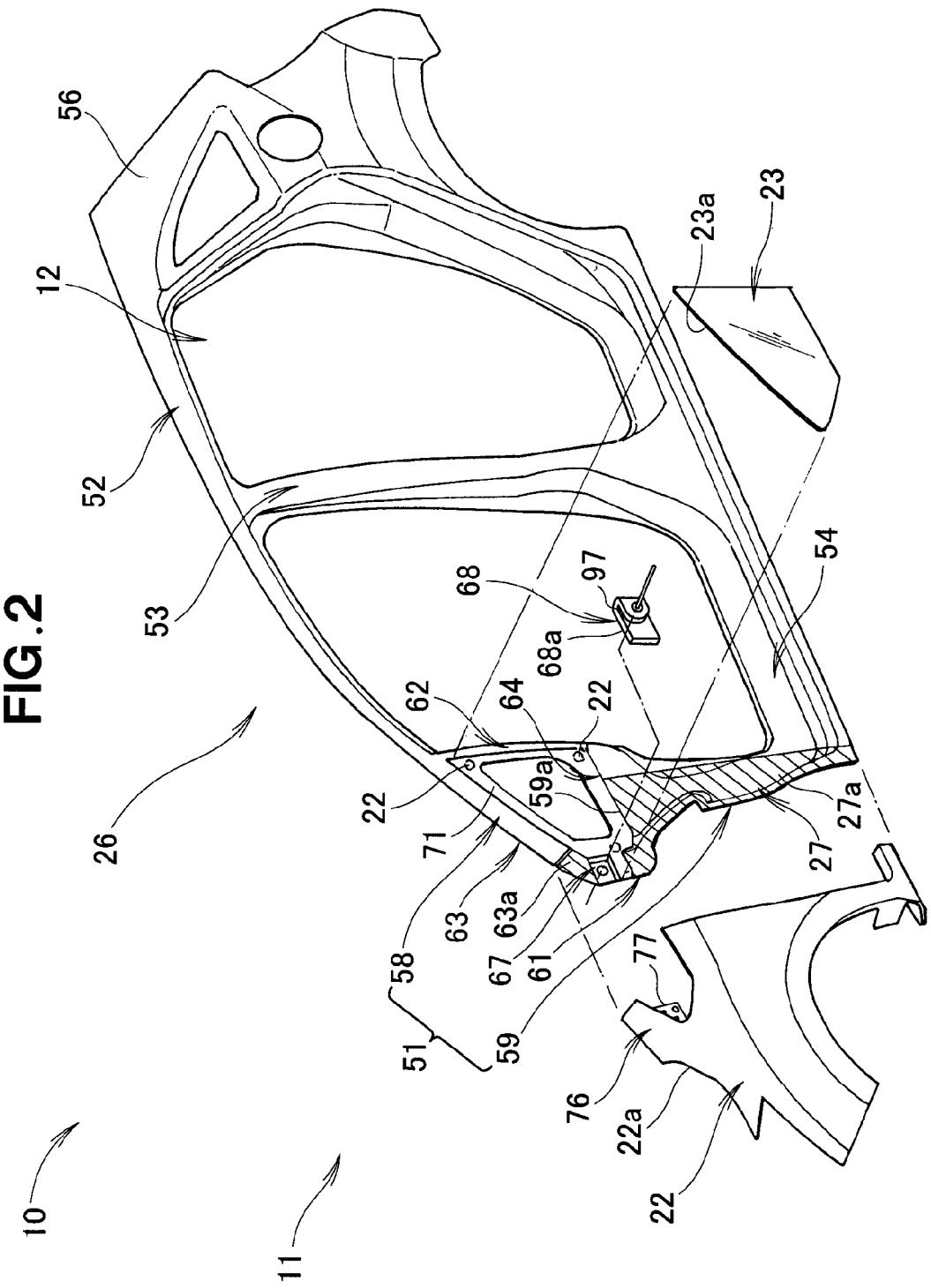
FIG. 2 is an exploded perspective view of the vehicle fender panel mounting structure according to a first embodiment of the present invention.
Figure 3:
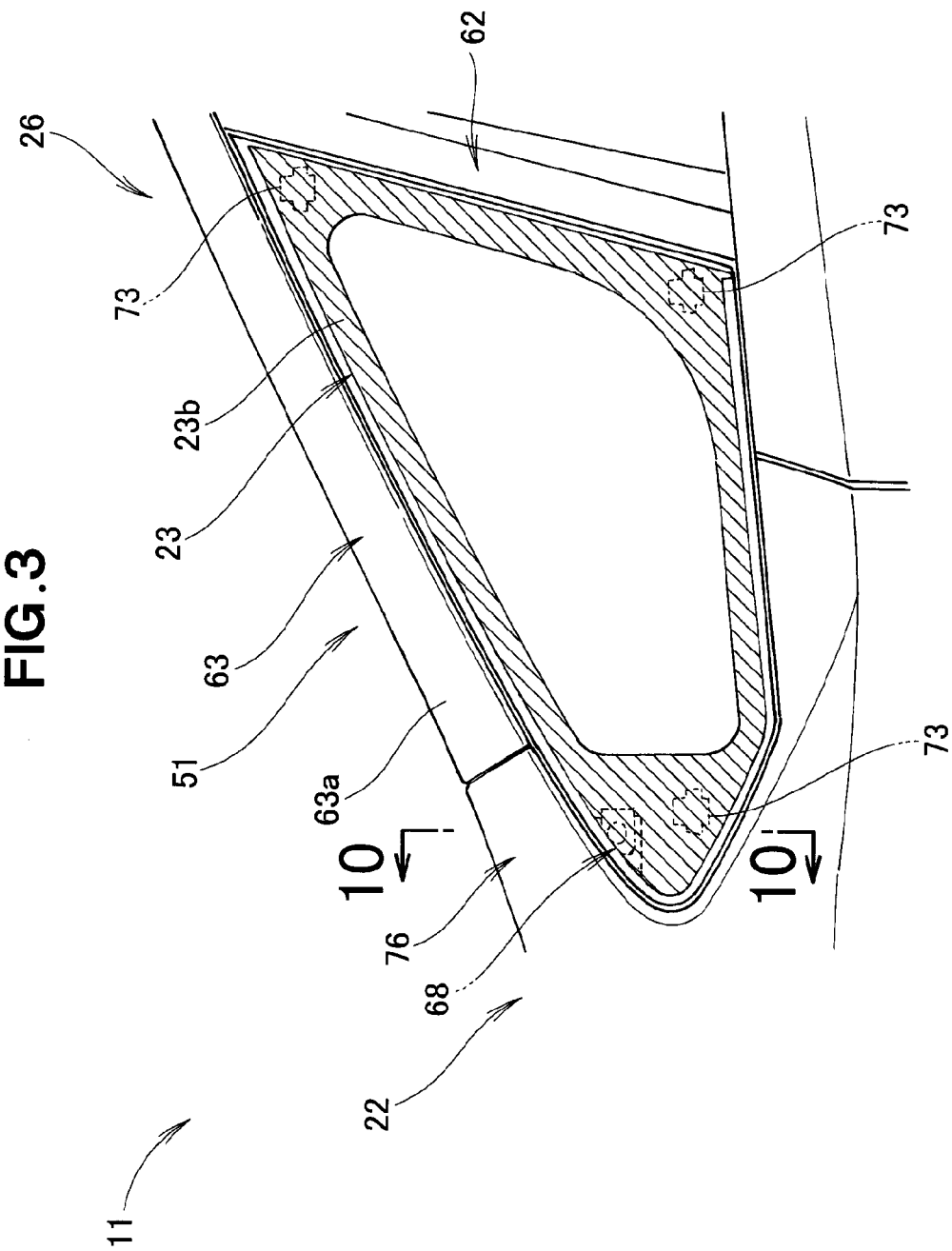
FIG. 3 is a side view of a fixed window and its peripheral parts shown in FIG. 2.
Figure 4:
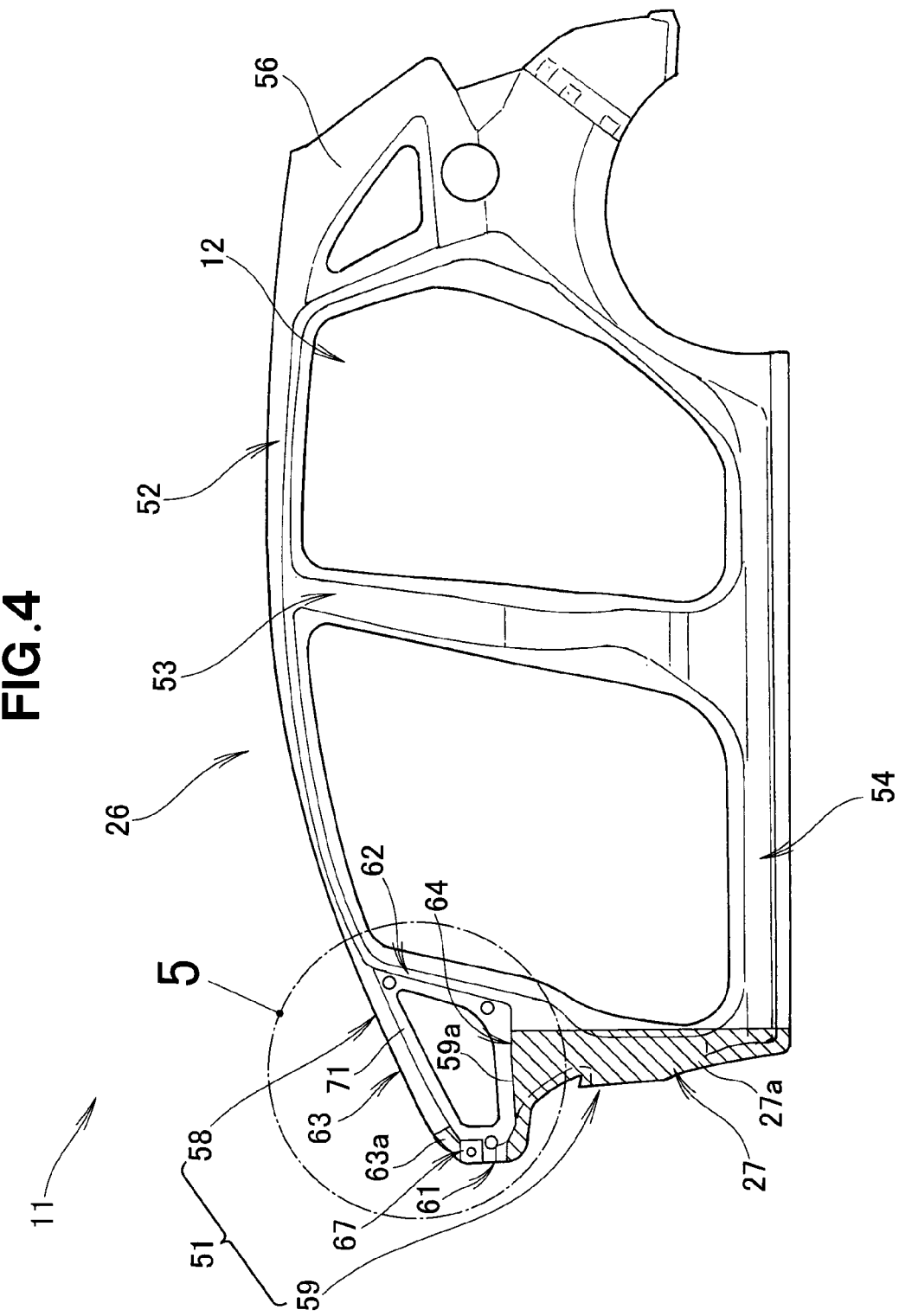
FIG. 4 is a side view of an outside panel shown in FIG. 2.

As shown in FIGS. 1 to 3, a hatchback type vehicle 10 with a tail gate (not shown) mounted in an openable and closable manner includes, on a lateral side of a vehicle body 11, a side panel 21 covering a side part of the vehicle body 11, a fender panel (front fender panel) 22 covering a front section of the side part of the vehicle body 11, and a triangular fixed window (corner window glass) 23 mounted on the side panel 21.

As shown in FIG. 2, in a vehicle fender panel mounting structure according to the first embodiment, the triangular fixed window (corner window glass) 23 is attached to an upper front end part of an outside panel 26, and a protrusion 76 is formed at an upper edge 22a of the fender panel 22 (more specifically, a part of the upper edge 22a closer to a center in a longitudinal direction of the vehicle body). The protrusion 76 has a flange 77 extending therefrom toward and along an inner surface 23a of the fixed window 23, and a clip 68 having a slit 97 formed at a position corresponding to the flange 77 and extending in the longitudinal direction of the vehicle body is attached to the upper front end part of the outside panel 26. By detachably fitting the flange 77 into the slit 97 of the clip 68, the upper edge 22a, or a rear end, of the fender panel 22 is fixed to the upper front end part of the outside panel 26. The upper front end part of the outside panel 26 is corresponding to an opening edge (window frame) 58 of a front pillar outer member 51 which will be described later.

As shown in FIG. 1, the side panel 21 is composed of an inner side panel 25 disposed on a cabin 12 side, and an outer side panel or outside panel 26 disposed on an outer side of the vehicle.

The inner side panel 25 includes a front pillar inner member 41, a roof rail inner member 42, a center pillar inner member 43, a side sill inner member 44, and a rear pillar inner member 45.

The outside panel 26 includes the front pillar outer member 51, a roof rail outer member 52, a center pillar outer member 53, a side sill outer member 54, a rear pillar outer member 55, and a rear fender panel 56.

The front pillar inner member 41 and the front pillar outer member 51 together form a front pillar 31. The roof rail inner member 42 and the roof rail outer member 52 together form a roof rail 32. The center pillar inner member 43 and the center pillar outer member 53 together form a center pillar 33.

The side sill inner member 44 and the side sill outer member 54 together form a side sill 34. The rear pillar inner member 45 and the rear pillar outer member 55 together form a rear pillar 35.

As shown in FIGS. 2 to 5, the front pillar outer member 51 includes the opening edge (window frame) 58 formed in an upper part thereof, and a vertical part 59 formed below the opening edge 58. The opening edge 58 is formed by a front frame member 61 extending upward, a rear frame member 62 extending upward, an upper frame member 63 extending obliquely forward and downward from an upper end of the rear frame member 62, and a lower frame member 64 extending substantially horizontally in the longitudinal direction of the vehicle body.

The opening edge 58 of the fixed window 23, i.e. the opening edge 58 of the front pillar outer member 51, has a recess 67 formed on a front part thereof (more specifically, on the front frame member 61 of the opening edge 58 to which the fixed window 23 is fixed) to bulge inward in a vehicle width direction at a position facing the inner surface 23a of the fixed window 23. The clip 68 is fitted into the recess 67 with a periphery 68a thereof being positioned. The recess 67 has a clip hole 69 formed therein for fixing the clip 68.

In other words, the recess 67 is formed in a clip mount section of the outside panel 26 to bulge inward in the vehicle width direction, i.e. toward the cabin 12 side, and the clip 68 is mounted in such a manner to be fitted along edges 67a, 67b of the recess 67.

Thus, there is no fear that the clip 68 would be turned or displaced by traveling vibration and the like without additionally providing a boss or the like. With the clip 68, the protrusion 76 of the fender panel 22 can be easily fixed, resulting in improved work efficiency. By thus providing the clip 68, the flange 77 of the fender panel 22 is firmly supported, so that vibration and noise generated from a vicinity of the protrusion 76 can be suppressed.

A fixed window supporting section 71 for supporting the fixed window 23 is formed on an inner part of the opening edge 58, and a plurality of window glass fixing holes 72 for attachment of the fixed window 23 are formed in the fixed window supporting section 71. Window glass fixing clips 73 are provided on the fixed window 23 to be mated with the window glass fixing holes 72. The fixed window supporting section 71 is corresponding to a periphery of the opening edge (window frame) 58. The lower frame member 64 is located at the same position as an upper end 59a of the vertical part 59.

The fixed window 23 is located below the front pillar 31 and joined to the outside panel 26 via a seal member (elastic body) 74 (see FIG. 10). More specifically, the window glass fixing clips 73 (different from the clip 68) are bonded on the inner surface 23a of the fixed window (corner window glass) 23 at three corners, and the fixed window 23 is fixed by fitting the window glass fixing clips 73 into the window glass fixing holes 72 in the outside panel 26. Further, black ceramic coating is applied on a periphery 23b of the fixed window (corner window glass) 23, and the window glass fixing clips 73 are thereby masked so as not to be visible from outside the vehicle. The inner surface 23a of the fixed window (corner window glass) 23 faces toward the cabin 12 side.

As shown in FIGS. 2, and 6 to 9, the fender panel 22 covers a lateral side surface of a front part of the vehicle body 11 and a front section 27a of the outer surface 27 of the outside panel 26. The fender panel 22 includes a fender body 75 covering the lateral side surface of the front part of the vehicle body 11, the protrusion 76 formed at the upper edge 22a of the fender panel 22, the flange 77 extending from a side edge 76a of the protrusion 76 facing the fixed window 23, and a plurality of mounting flanges 78a to 78f for attachment to the vehicle body 11. Note that the front section 27a includes a lower end 63a of the upper frame member 63.

The protrusion 76 is formed on a longitudinal middle section of the upper edge 22a of the fender panel 22 so as to cover the lower end 63a of the upper frame member 63 forming a part of the front pillar 31 (more specifically, the front pillar outer member 51). The protrusion 76 may be formed to extend from a rear end of the upper edge 22a of the fender panel 22, not only from the longitudinal middle section of the upper edge 22a.

The flange 77 extends from the side edge 76a of the protrusion 76 facing the fixed window 23 toward and along the inner surface 23a of the fixed window 23. Further, the flange 77 has a projection 81 formed to project outward in the vehicle width direction, and reinforcing beads 82, 82 formed adjacent to a base 76b of the protrusion 76. The projection 81 forms an engagement part for engagement with the clip 68, more specifically, with an opening 111 of the clip 68 which will be described later. The projection 81 has a bowl-shaped cross section, and formed in a regular hexagonal shape in a side view. The projection 81 may be formed in a circular or elliptical shape in a side view.

Namely, the flange 77 has the projection 81 formed on the engagement part for engagement with the clip 68 and projecting outward in the vehicle width direction, and the clip 68 has the opening 111 for engagement with the projection 81, whereby the projection 81 of the flange 77 and the opening 111 of the clip 68 are engaged with each other.

Since the flange 77 has the reinforcing beads 82, 82 formed thereon adjacent to the base 76b of the protrusion 76, the strength of the flange 77 is increased. The flange 77 can therefore be prevented from being vibrated by traveling vibration and the like, and thus vibration and noise generated from the vicinity of the protrusion 76 can be suppressed. Further, during repair operation of the fender panel 22, the protrusion 76 can be easily fixed, resulting in improved work efficiency.

With the mounting flanges 78a to 78f (FIGS. 6, 7) formed on a periphery of the fender panel 22 at predetermined intervals, the fender panel 22 is fixedly mounted on the vehicle body 11 via bolts. The fender panel 22 has the protrusion 76 formed so as to cover the lower end 63a of the front pillar 31 (i.e., upper frame member 63) of the outside panel 26 from outside in the vehicle width direction. The protrusion 76 extends from the longitudinal middle section of the upper edge 22a of the fender panel 22 along the front pillar 31.

Further, the fender panel 22 includes the projection 81 formed to project outward in the vehicle width direction at a position corresponding to the clip 68 mounted on the outside panel 26. After the fender panel 22 is mounted, the projection 81 is engaged with the opening 111 of the clip 68, whereby a restriction in the longitudinal direction, the width direction, and a vertical direction of the vehicle body can be realized at a single section. As a result, it is possible to ensure easy positioning capability and good fitting stability.

Figure 10:
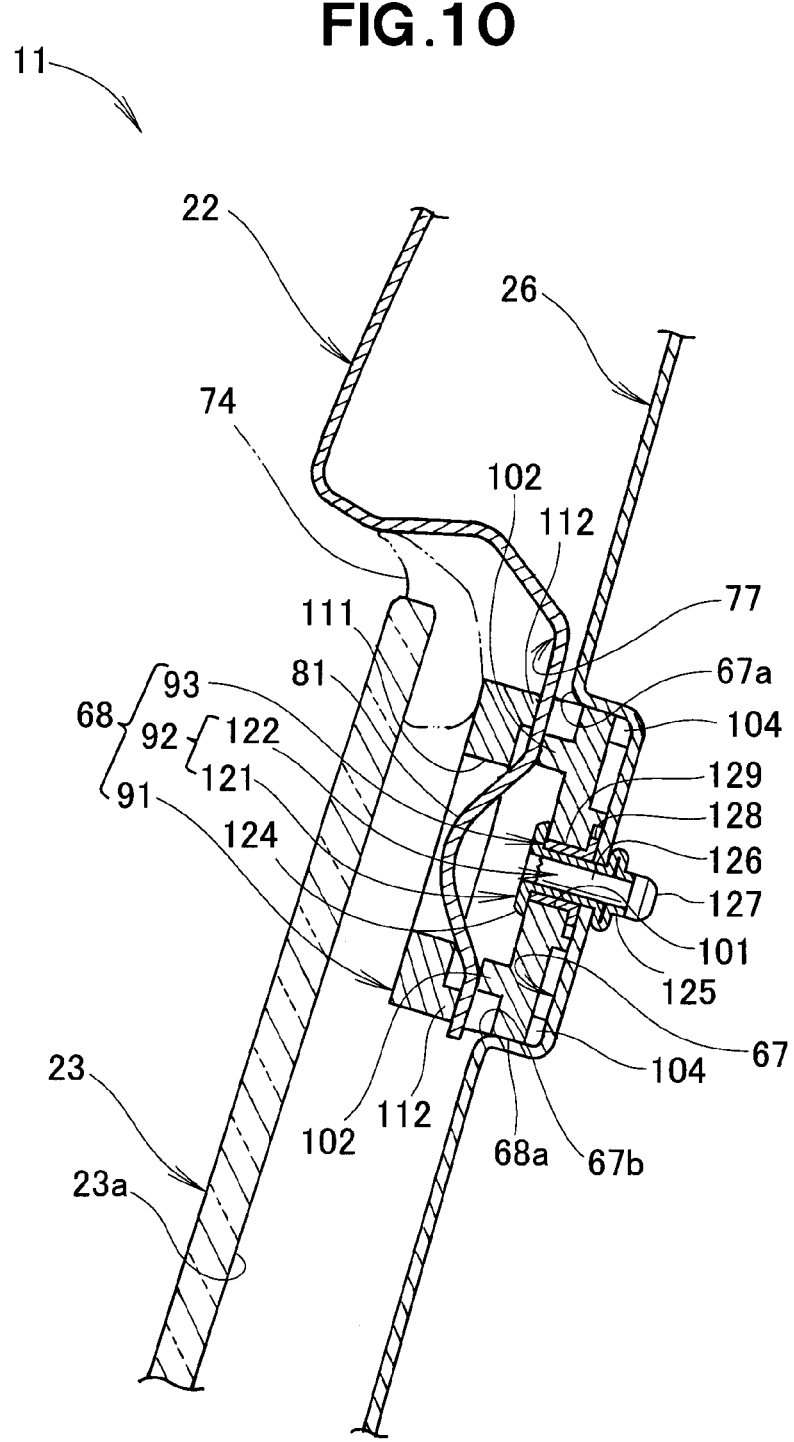
FIG. 10 is an enlarged cross-sectional view taken along line 10-10 of FIG. 3.
Figure 11:
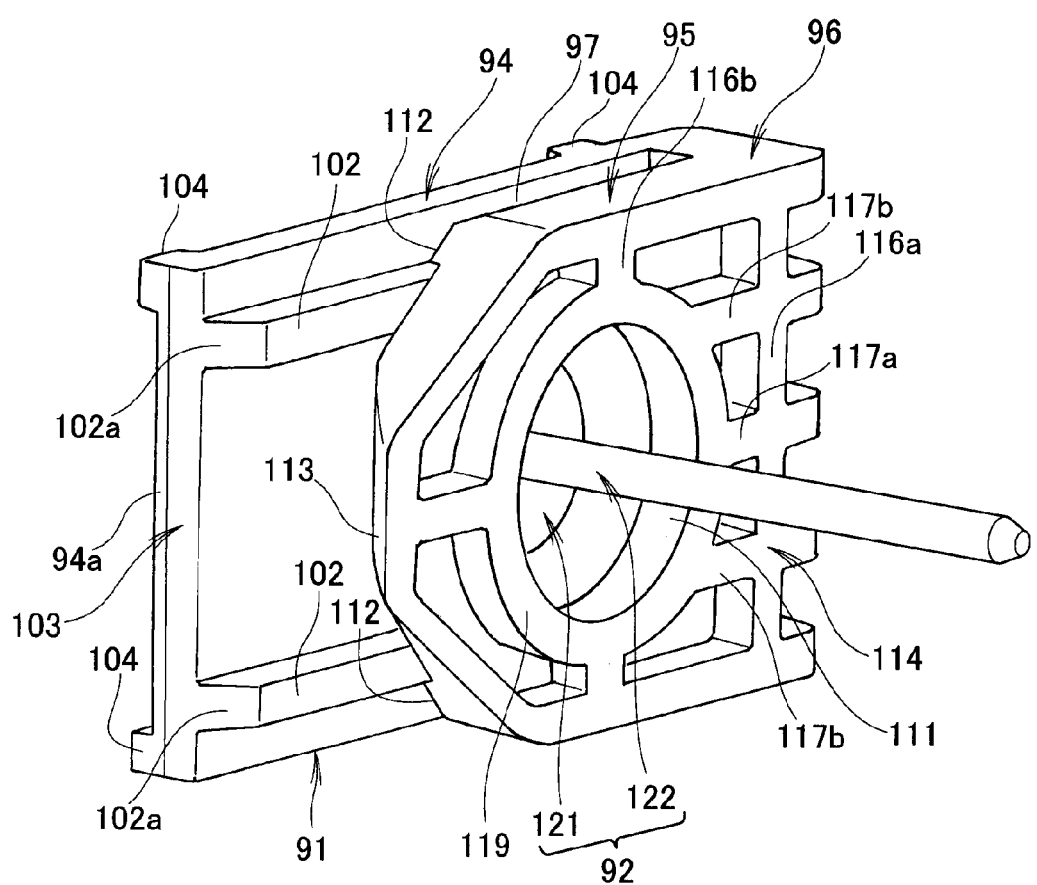
FIG. 11 is a perspective view of a clip shown in FIG. 2 as viewed from outside of a vehicle body.
Figure 12:
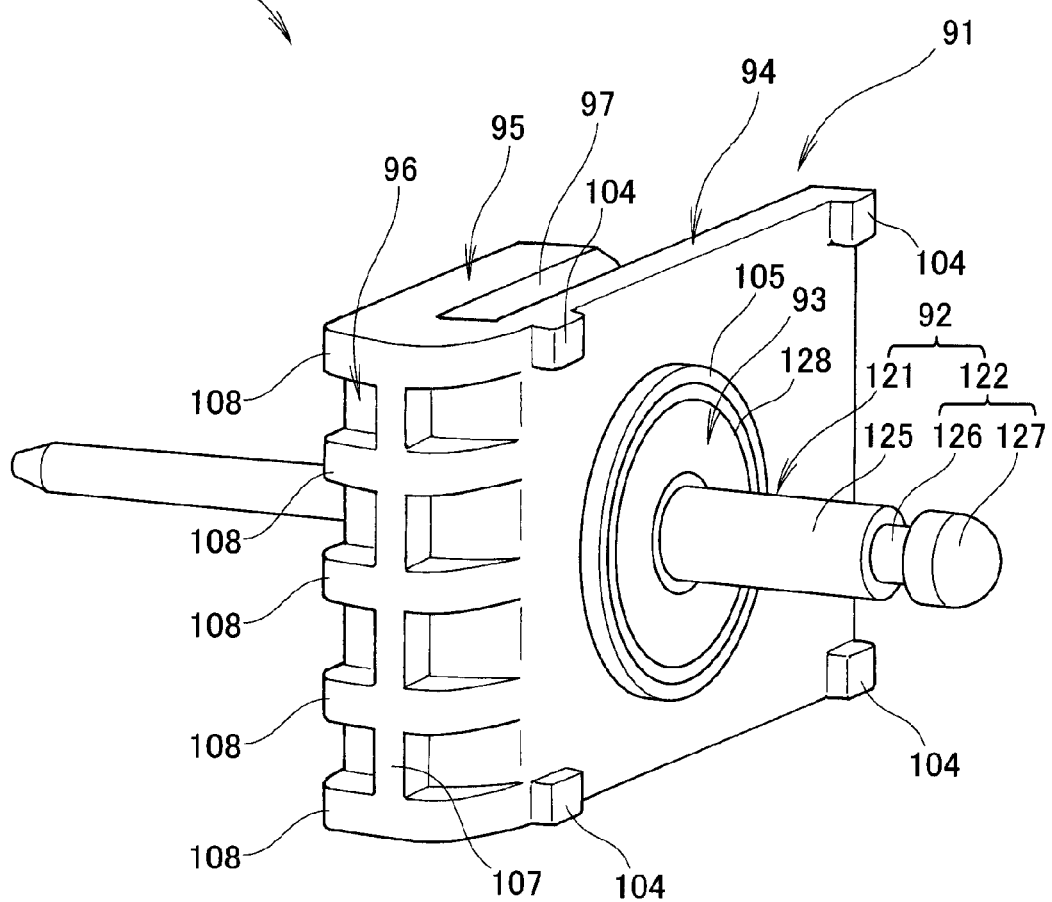
FIG. 12 is a perspective view of the clip shown in FIG. 2 as viewed from inside of the vehicle body.

As shown in FIGS. 10 to 12, the clip (clip assembly) 68 includes a clip body 91 for clamping the fender panel 22, a rivet 92 for attaching the clip body 91 to the outside panel 26, and a collar 93 fitted to the clip body 91. The clip body 91 is formed of resin. The rivet 92 and the collar 93 are formed of metal. The rivet 92 is preferably formed of aluminum. The clip body 91 is attached to the recess 67 formed on the opening edge 58 (FIG. 5) of the outside panel 26.

The clip body 91 has an inner base 94 located inward to face the outside panel 26, an outer base 95 located outward to face the fixed window 23, a connecting part 96 formed to connect the inner base 94 and the outer base 95, and a substantially U-shaped slit 97 formed by the inner base 94 and the outer base 95.

Figure 5:
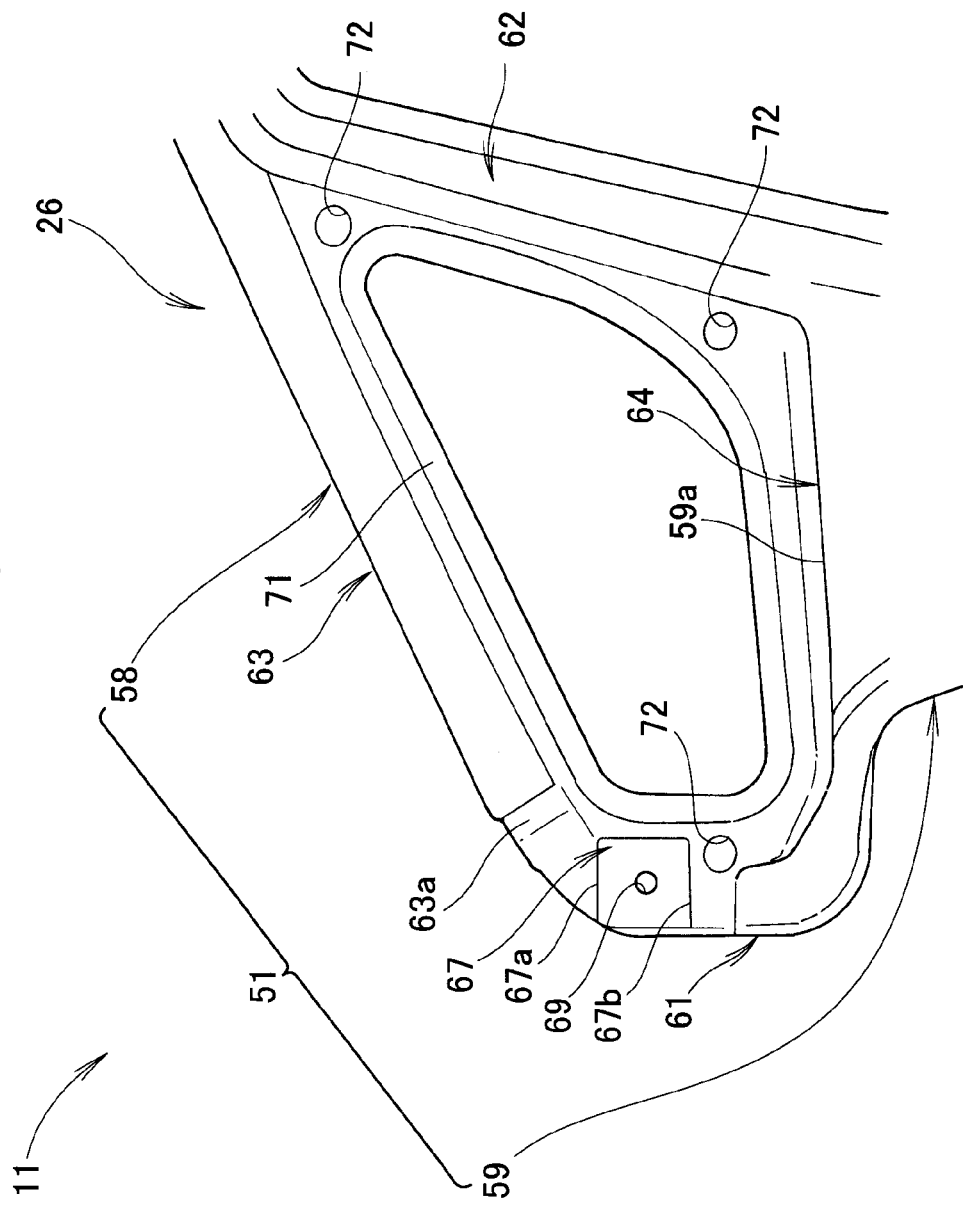
FIG. 5 is an enlarged view of section 5 of FIG. 4.
Figure 6:
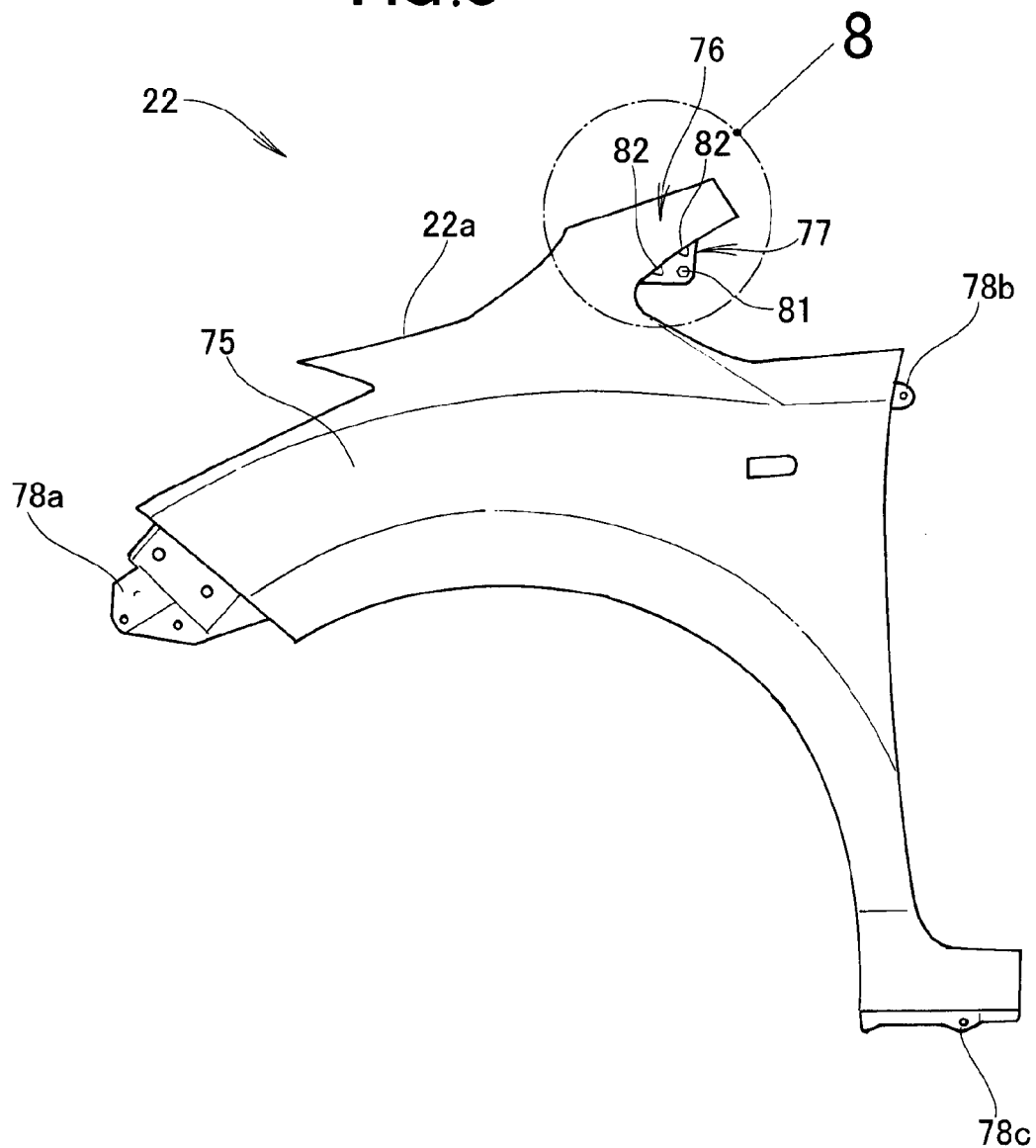
FIG. 6 is a side view of a fender panel shown in FIG. 2.
Figure 7:
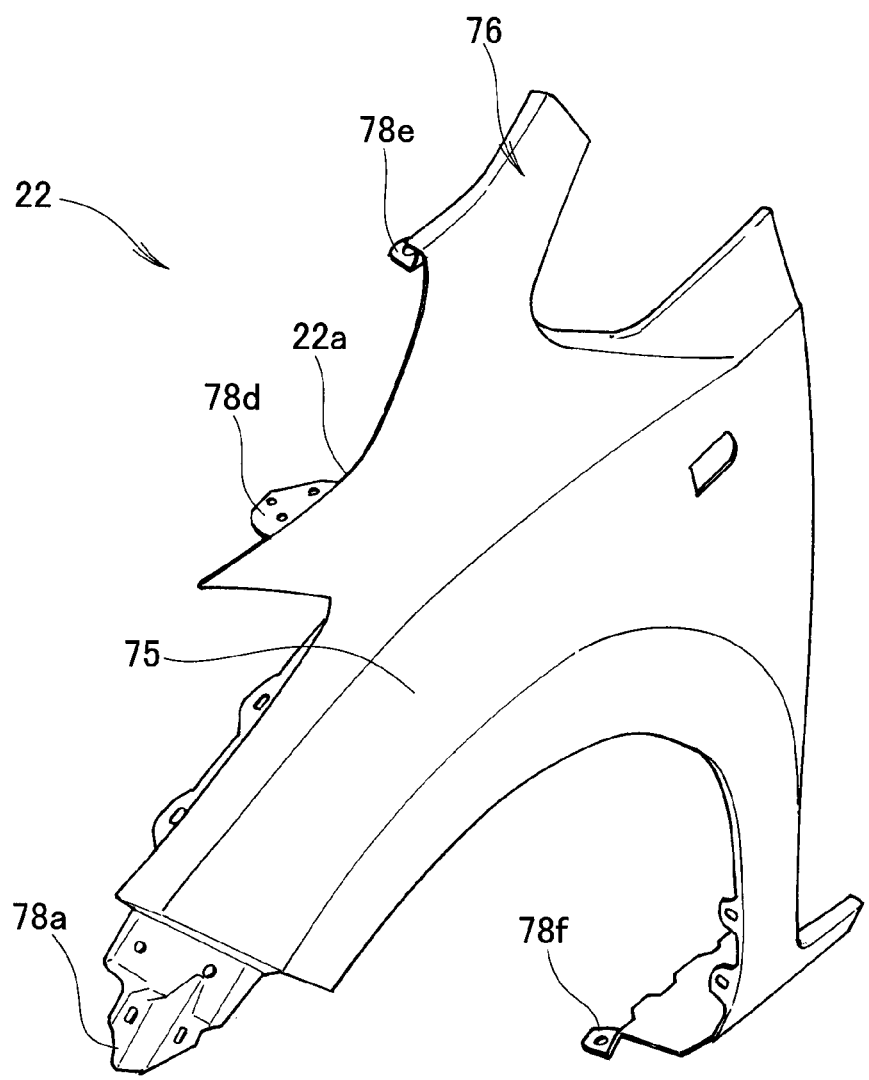
FIG. 7 is a perspective view of the fender panel shown in FIG. 2.

The inner base 94 is a portion to be fitted into the recess 67 of the opening edge 58 (FIG. 5). The inner base 94 has a through hole 101 for passage therethrough the rivet 92 and the collar 93, ridges 102, 102 that come into contact with the flange 77 on the side facing the outside panel 26, a slope 103 for allowing the flange 77 to be slid easily, a plurality of legs 104 that come into contact with the recess 67, and a ring 105 that comes into contact with the recess 67.

The ridges 102, 102 are formed on the inner base 94 to face and project toward the outer base 95. The ridges 102, 102 are supporting portions for preventing a backlash of the flange 77 in the vehicle width direction. The slope 103 is formed from an end 94a of the inner base 94 on the side adjacent to the fender panel 22 to ends 102a, 102a of the ridges 102, 102 on the side adjacent to the fender panel 22 so as to have an inclined or beveled edge. The slope 103 serves to allow the flange 77 to be inserted smoothly into the slit 97.

The legs 104 are formed on the inner base 94 at four corners on a surface facing the outside panel 26. The ring 105 is formed around the through hole 101 on the surface facing the outside panel 26. The connecting part 96 has a vertical rib 107 and a plurality of horizontal ribs 108 for reinforcing the connecting part 96.

As shown in FIG. 11, the outer base 95 has the opening 111 for allowing the rivet 92 to be inserted therethrough, ridges 112, 112 that come into contact with the flange 77 on the side facing the fixed window 23, a slope 113 for allowing the flange 77 to be slid easily, and a base-side rib 114 for reinforcing the outer base 95.

The opening 111 is not only an insertion hole through which the rivet 92 is inserted when the clip 68 is fixed to the outside panel 26, but also an engagement hole for engagement with the projection 81 of the flange 77. The base-side rib 114 includes vertical ribs 116a, 116b, horizontal ribs 117a, 117b, 117b, and a ring-shaped rib 119.

The slope 113 of the outer base 95 serves to allow the flange 77 to be inserted smoothly into the slit 97 in cooperation with the slope 103 of the inner base 94. The ridges 112, 112 are formed on the outer base 95 to face and project toward the inner base 94. The ridges 112, 112 are supporting portions for preventing a backlash of the flange 77 in the vehicle width direction.

As shown in FIG. 12, the rivet 92 is composed of a rivet body 121 that penetrates through the collar 93 and the clip hole 69 (FIG. 5) of the recess 67, and a pin 122 that penetrates through the rivet body 121.

The rivet body 121 has a flange part 124 (FIG. 10) formed to be in contact with the inner base 94 and an end of the collar 93, and a cylindrical part 125 passing through the through hole 101 and the clip hole 69. The pin 122 has a pin body 126 passing through the cylindrical part 125, and an expansion part or head 127 formed at one end of the pin body 126.

As shown in FIG. 10, the collar 93 has a collar flange part 128 formed to be in contact with the recess 67, and a collar cylindrical part 129 extending from the collar flange part 128 to be in contact with the flange part 124 of the rivet body 121. The collar 93 is inserted into the through hole 101 of the inner base 94, and serves to prevent the inner base 94, which is formed of resin, from being collapsed and reduced in thickness when caulking the rivet 92.

To caulk the rivet 92, the pin 122 is pulled using a dedicated tool (not shown) outward of the vehicle body, whereby the cylindrical part 125 of the rivet body 121 is deformed and the clip body 91 is fastened to the recess 67. A surplus portion of the pin body 126 projecting from the flange part 124 of the rivet body 121 is then removed, and the caulking is completed as shown in FIG. 10.

As described above, in the vehicle fender panel mounting structure, the opening edge 58 of the fixed window 23 (more precisely, the opening edge 58 on which the fixed window 23 is mounted) is provided with the clip 68 having the slit 97 formed at the position corresponding to the flange 77 and extending in the longitudinal direction of the vehicle body, and the flange 77 is detachably engaged with the slit 97 of the clip 68 to thereby lock the protrusion 76 to the opening edge 58 of the fixed window 23, as shown in FIGS. 2, 10, and 11.

The clip 68 is formed in a substantially U shape opened forward of the vehicle, and having the slit 97 extending in the longitudinal direction of the vehicle body in a state of being attached. The flange 77 is detachably engaged with the slit 97, thereby fixing the protrusion 76 of the fender panel 22.

Since the flange 77 of the protrusion 76 of the fender panel 22 is not secured via a bolt, a fixing section of the protrusion 76 can be arranged inward of the fixed window (corner window glass) 23. There is no need to provide an additional member such as a garnish. The fixing section can be made invisible by applying black ceramic coating on the periphery 23b (FIG. 3) of the fixed window 23, and an improved outer appearance can thus be obtained.

Further, the protrusion 76 can be easily fixed without causing breakage of the clip 68 even if repair and maintenance operation of the fender panel 22 is performed a plurality of times, and thus the work efficiency can be improved. The protrusion 76 can be securely fixed in this manner without using a foamed material, so that vibration and noise generated from the vicinity of the protrusion 76 can be suppressed.

Figure 13:
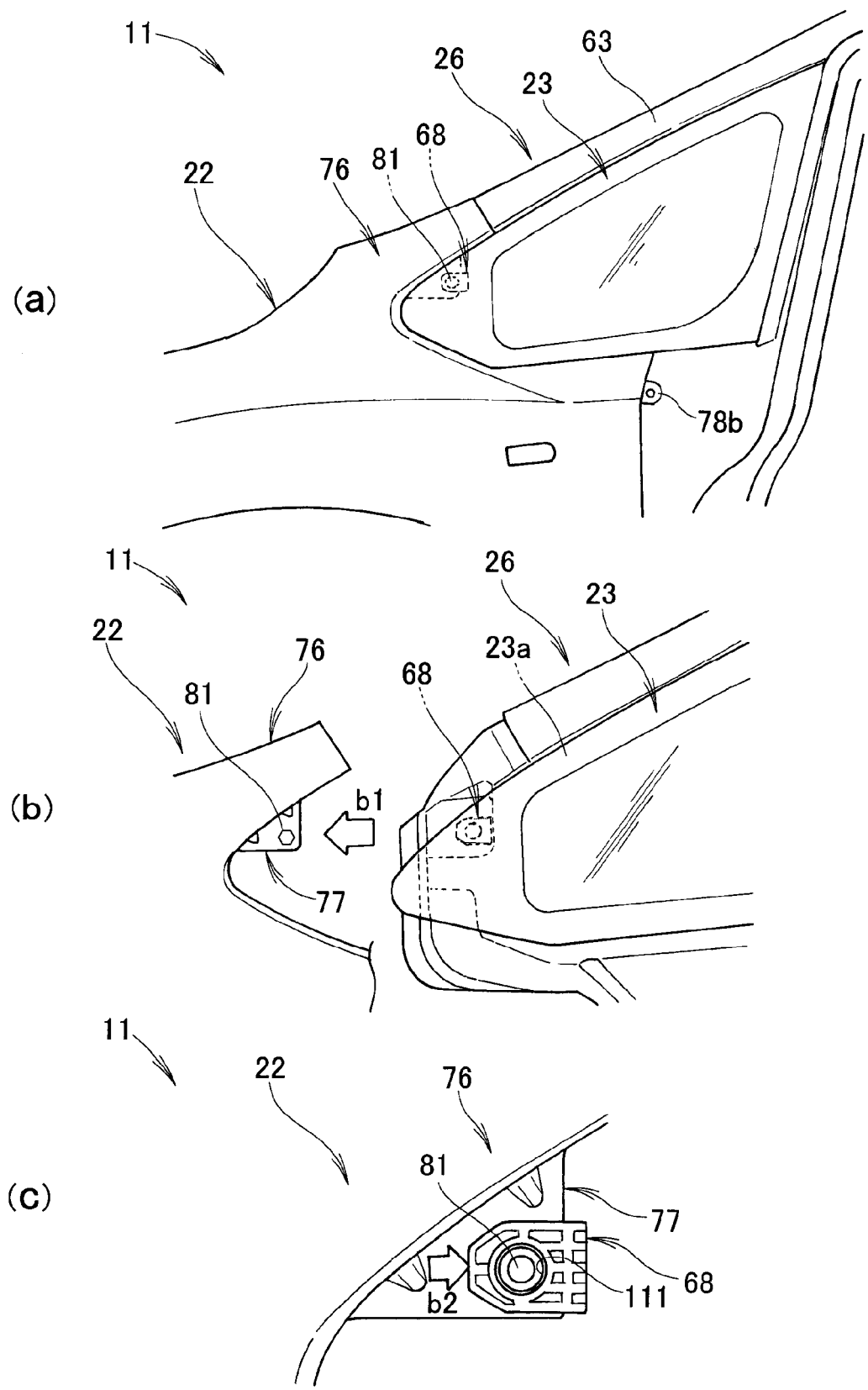
FIG. 13 is a view showing processes for detaching and attaching the fender panel in the vehicle fender panel mounting structure shown in FIG. 1.
Figure 14:
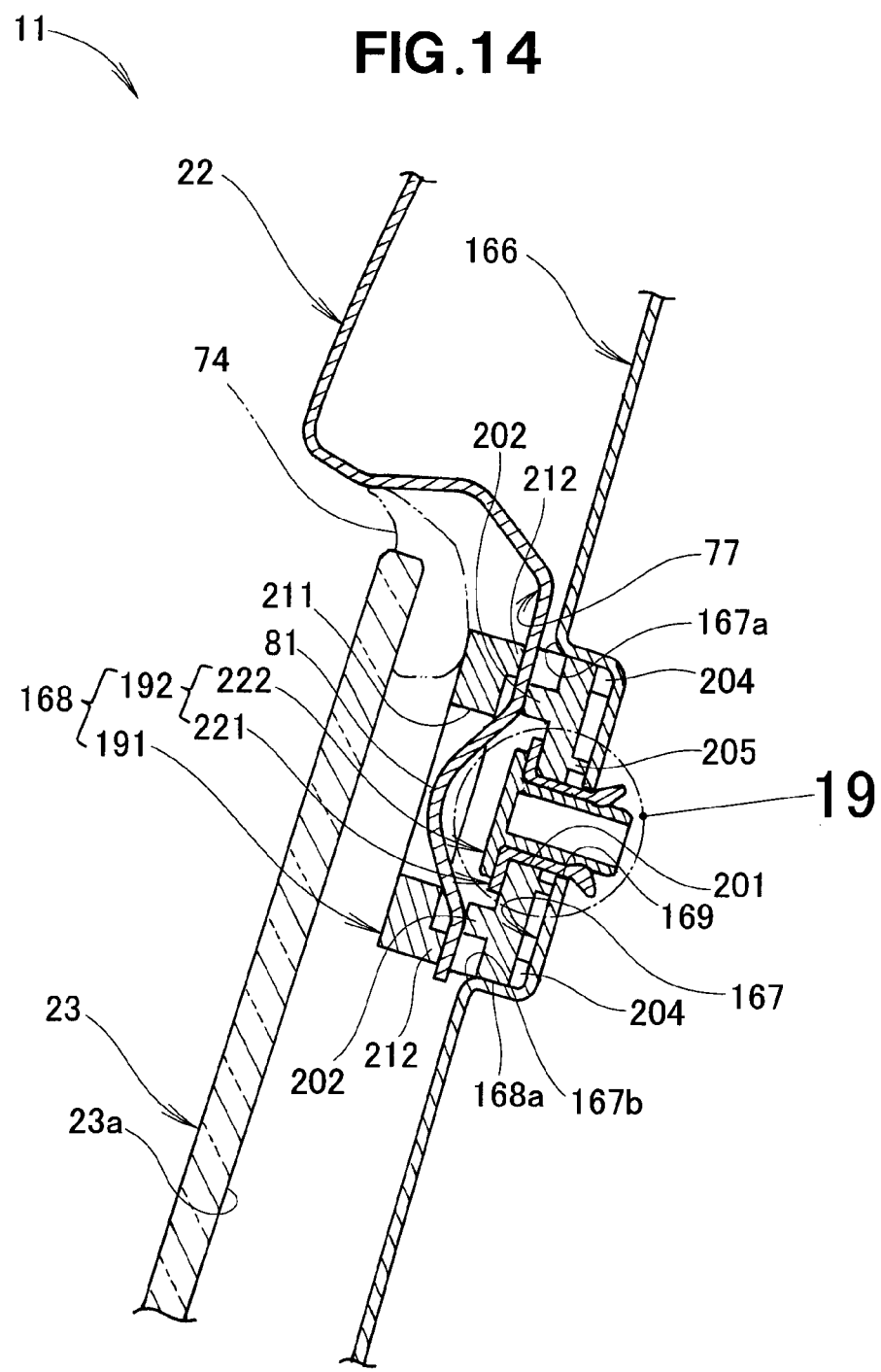
FIG. 14 is a cross-sectional view of a vehicle fender panel mounting structure according to a second embodiment of the present invention.

FIGS. 13(a) to 13(c) show processes for detaching and attaching the fender panel 22. In FIG. 13(a), bolts (not shown) are removed from the mounting flanges 78a to 78f (FIGS. 6, 7) formed on the periphery of the fender panel 22 at predetermined intervals.

In FIG. 13(b), the fender panel 22 is slid forward of the vehicle body as indicated by arrow b1 while being pulled outward of the vehicle body. The flange 77 of the protrusion 76 of the fender panel 22 is detached from the slit 97 (FIG. 11) of the clip 68 of the outside panel 26 (or, the projection 81 of the flange 77 is disengaged from the opening 111 of the clip 68), and the fender panel 22 is released. In this manner, the fender panel 22 can be easily detached without detaching the fixed window (corner window glass) 23 mounted on the outside panel 26.

In FIG. 13(c), the fender panel 22 is attached in a reverse process to the one shown in FIG. 13(b). Note that the outside panel 26 etc. are omitted in FIG. 13(c). The flange 77 is inserted along the inner surface 23a (FIG. 13(b)) of the fixed window 23, and the mounting flanges 78a to 78f (FIGS. 6, 7) formed on the periphery of the fender panel 22 at predetermined intervals are fixed to the vehicle body 11 (FIG. 13(a)) via the bolts (not shown). The projection 81 of the flange 77 is engaged with the opening 111 of the clip 68, thereby easily positioning the flange 77, and the restriction in the longitudinal direction, the width direction, and the vertical direction of the vehicle body can be realized at the single section, thereby ensuring good fitting stability.

As shown in FIGS. 2 and 10, the vehicle 10 includes the triangular fixed window 23 located below the front pillar 31 and joined to the outside panel 26. The fender panel 22, which covers the front section 27a of the outer surface 27 of the outside panel 26, has the protrusion 76 formed at the upper edge 22a thereof so as to cover the lower end 63a of the upper frame member 63 forming the front pillar 31 (front pillar outer member 51).

In the vehicle fender panel mounting structure, the protrusion 76 has the flange 77 extending toward and along the inner surface 23a of the fixed window 23, and the opening edge 58 of the fixed window 23 (the opening edge 58 on which the fixed window 23 is mounted) is provided with the clip 68 having the slit 97 formed at the position corresponding to the flange 77 and extending in the longitudinal direction of the vehicle. The flange 77 is detachably engaged with the slit 97 of the clip 68 to thereby lock the protrusion 76 to the opening edge 58 of the fixed window 23. As a result, the fixing section of the protrusion 76 can be arranged inward of the fixed window 23, and thus there is no need to provide an additional member such as a garnish. The fixing section can be made invisible by applying black ceramic coating on the periphery 23b of the fixed window 23, and an improved outer appearance can thus be obtained.

Further, the protrusion 76 can be easily fixed without causing breakage of the clip 68 even if repair and maintenance operation of the fender panel 22 is performed a plurality of times, and thus the work efficiency can be improved. The protrusion 76 can be securely fixed in this manner without using a formed material, so that vibration and noise generated from the vicinity of the protrusion 76 can be suppressed.

Also as shown in FIGS. 2 and 10, in the vehicle fender panel mounting structure, the flange 77 has the projection 81 projecting outward in the vehicle width direction, and the clip 68 has the opening 111 for engagement with the projection 81. By thus configuring the projection 81 of the flange 77 and the opening 111 of the clip 68 to be engaged with each other, when fixing the fender panel 22, the restriction in the longitudinal direction, the width direction, and the vertical direction of the vehicle can be realized at the single section, thereby ensuring easy positioning capability and good fitting stability.

As a result, the protrusion 76 of the fender panel 22 can be fixed more easily, and thus the work efficiency can be further improved. Since the fender panel 22 can be securely fixed in this manner, vibration and noise generated from the vicinity of the protrusion 76 can be further suppressed.

Still also as shown in FIGS. 2 and 10, in the vehicle fender panel mounting structure, the opening edge 58 of the fixed window 23 (the opening edge 58 on which the fixed window 23 is mounted) has the recess 67 formed on the front part thereof, and the clip 68 is fitted into the recess 67. Thus, the protrusion 76 can be fixed more easily with no fear that the clip 68 would be turned or displaced by traveling vibration and the like. As a result, it is possible to further improve the work efficiency, while further suppressing vibration and noise generated from the vicinity of the protrusion 76.

As shown in FIG. 8, in the vehicle fender panel mounting structure, since the flange 77 has the reinforcing beads 82, 82 formed thereon adjacent to the base 76b of the protrusion 76 (formed from the base 76b of the protrusion 76 to the flange 77) for increasing the strength of the flange 77, the flange 77 can be prevented from being vibrated by traveling vibration and the like, and thus vibration and noise generated from the vicinity of the protrusion 76 can be further suppressed. Moreover, during repair operation of the fender panel 22, the protrusion 76 can be fixed more easily, and thus the work efficiency can be further improved.

Embodiment 2

FIGS. 14 to 19 show a vehicle fender panel mounting structure according to the second embodiment. In the vehicle fender panel mounting structure of the second embodiment, a resin grommet 192 is provided in place of the rivet 92 in the one of the first embodiment shown in FIG. 10. Parts that are the same as in the first embodiment are indicated by the same reference characters, and a detailed description thereof will be hereinafter omitted.

As shown in FIGS. 14 to 19, a clip (clip assembly) 168 includes a clip body 191 for clamping the fender panel 22, and the grommet 192 for attaching the clip body 191 to an outside panel 166. The clip body 191 and the grommet 192 are formed of resin. The clip body 191 is attached to a recess 167 formed on the outside panel 166. The clip 168 is mounted in such a manner to be fitted along edges 167a, 167b of the recess 167, whereby a periphery 168a of the clip 168 is positioned within the recess 167.

Figure 15:
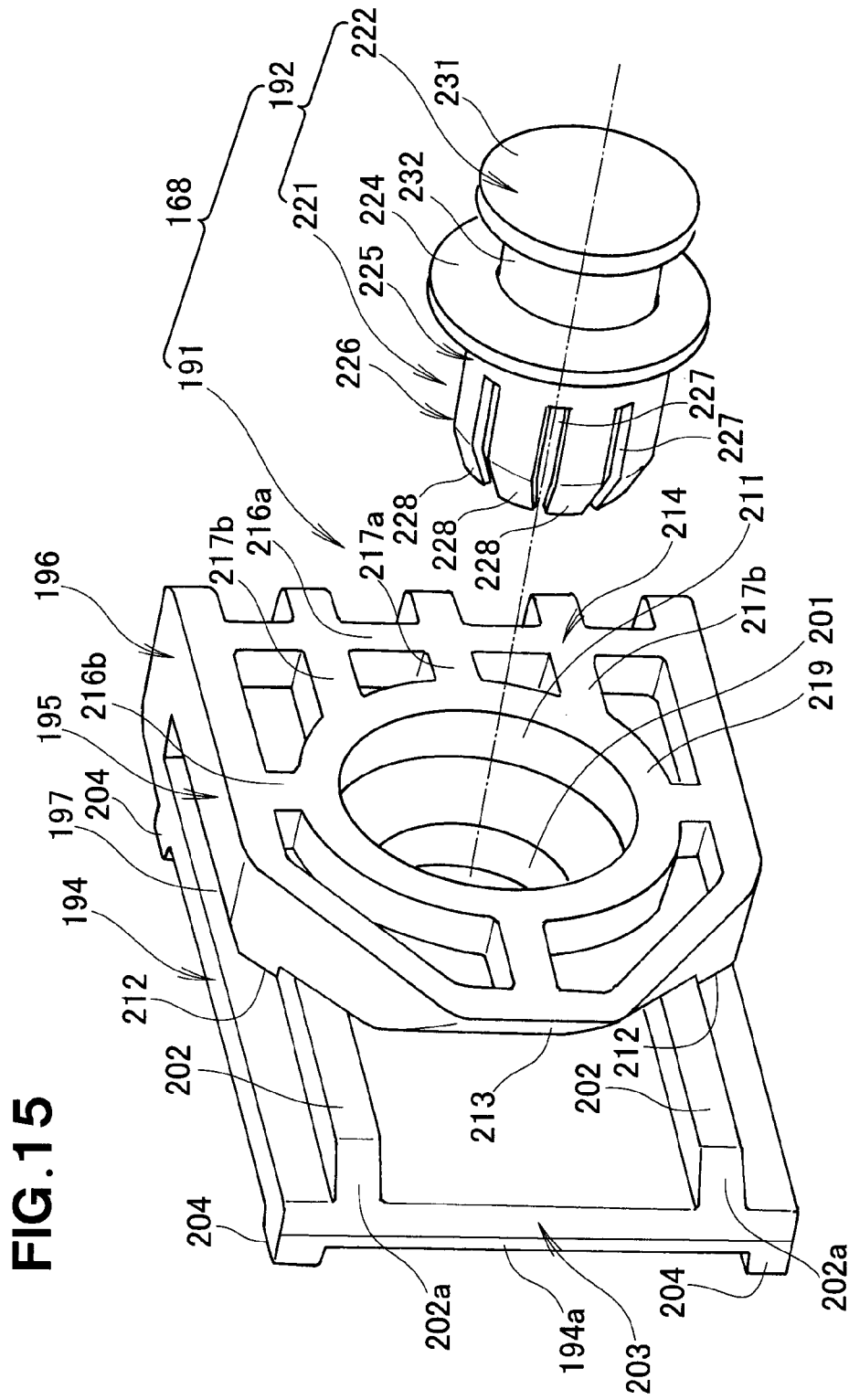
FIG. 15 is an exploded perspective view of a clip shown in FIG. 14.
Figure 16:
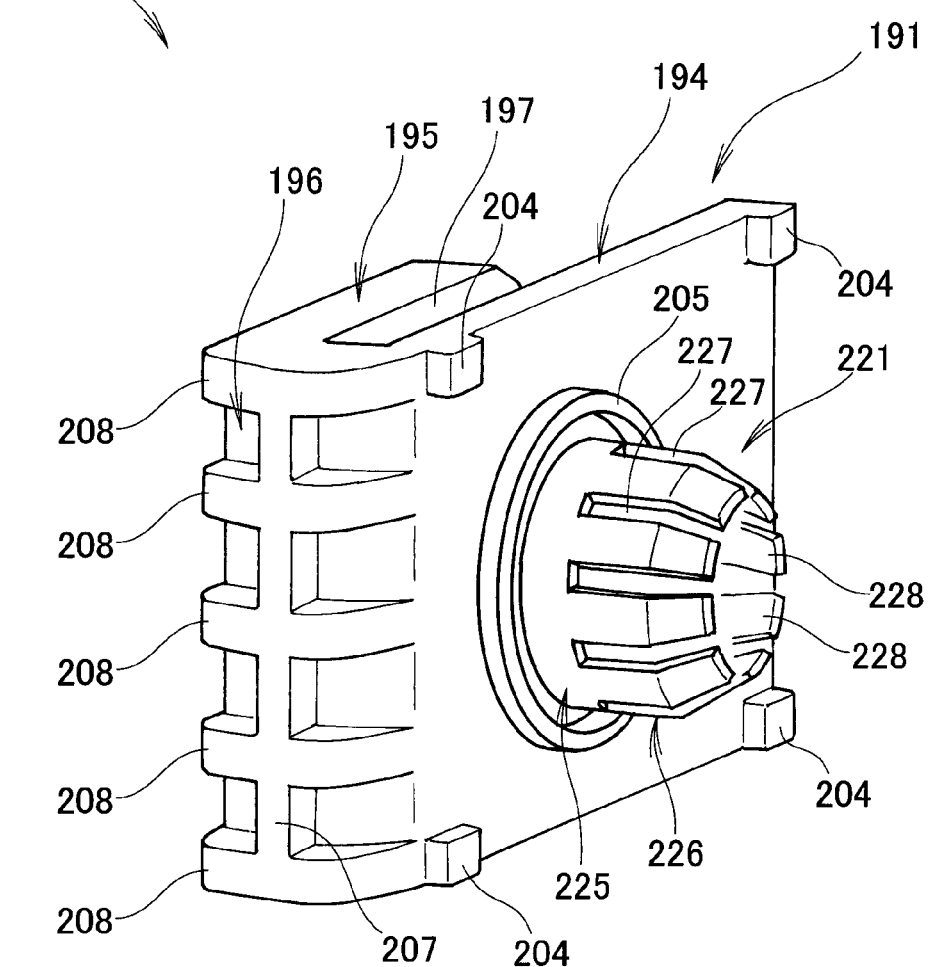
FIG. 16 is a perspective view of the clip shown in FIG. 14.
Figure 17:
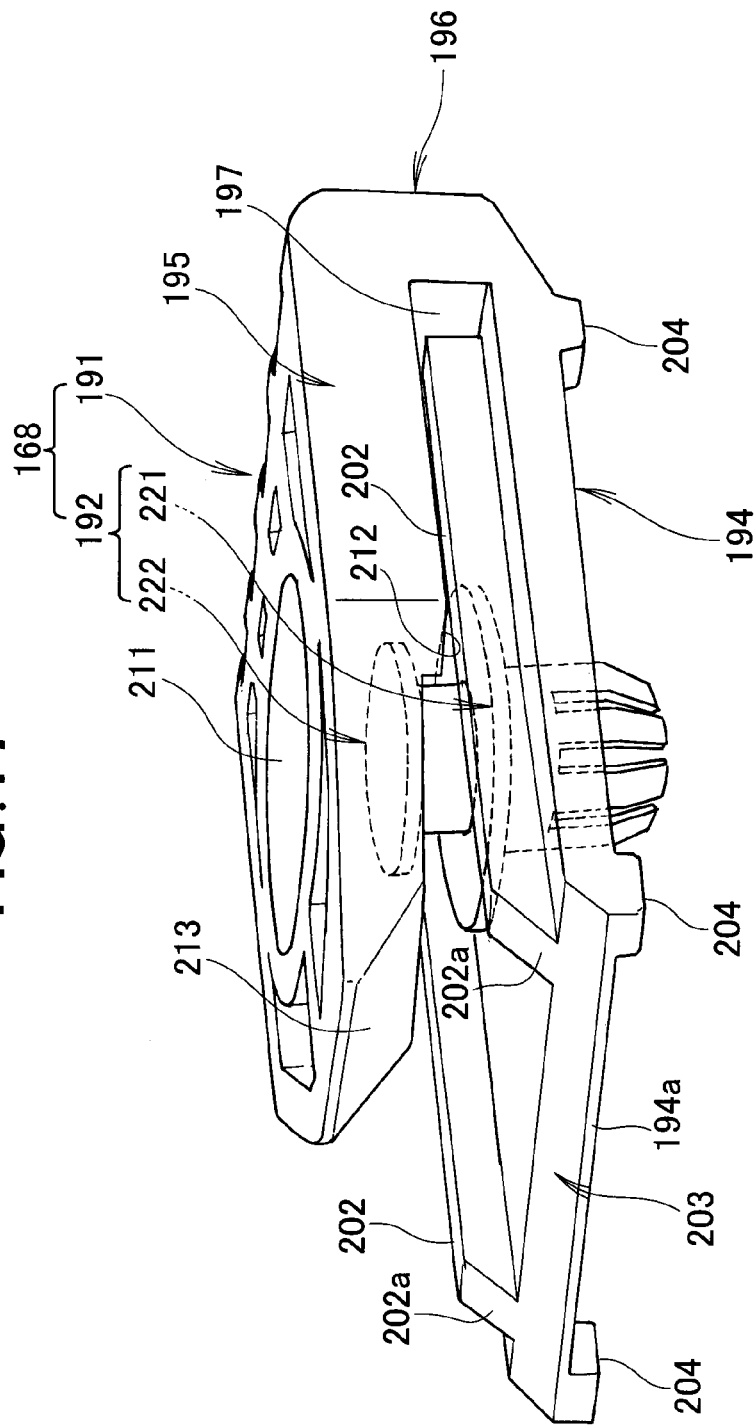
FIG. 17 is a perspective view of the clip shown in FIG. 14 as viewed from another angle.

As shown in FIGS. 15 and 16, the clip body 191 has an inner base 194 located inward to face the outside panel 166, an outer base 195 located outward to face the fixed window 23, a connecting part 196 formed to connect the inner base 194 and the outer base 195, and a substantially U-shaped slit 197 formed by the inner base 194 and the outer base 195.

The inner base 194 is a portion to be fitted into the recess 167. The inner base 194 has a through hole 201 for passage therethrough the grommet 192, ridges 202, 202 that come into contact with the flange 77 on the side facing the outside panel 166, a slope 203 for allowing the flange 77 to be slid easily, a plurality of legs 204 that come into contact with the recess 167, and a ring 205 that comes into contact with the recess 167.

The ridges 202, 202 are formed on the inner base 194 to face and project toward the outer base 195. The ridges 202, 202 are supporting portions for preventing a backlash of the flange 77 in the vehicle width direction. The slope 203 is formed from an end 194a of the inner base 194 on the side adjacent to the fender panel 22 to ends 202a, 202a of the ridges 202, 202 on the side adjacent to the fender panel 22 so as to have an inclined or beveled edge. The slope 203 serves to allow the flange 77 to be inserted smoothly into the slit 97.

As shown in FIG. 16, the legs 204 are formed on the inner base 194 at four corners on a surface facing the outside panel 166. The ring 205 is formed around the through hole 201 on the surface facing the outside panel 166. The connecting part 196 has a vertical rib 207 and a plurality of horizontal ribs 208 for reinforcing the connecting part 196.

As shown in FIG. 15, the outer base 195 has an opening 211 for allowing the grommet 192 to be inserted therethrough, ridges 212, 212 that come into contact with the flange 77 on the side facing the fixed window 23, a slope 213 for allowing the flange 77 to be slid easily, and a base-side rib 214 for reinforcing the outer base 195.

The opening 211 is not only an insertion hole through which the grommet 192 is inserted when the clip 168 is fixed to the outside panel 166, but also an engagement hole for engagement with the projection 81 of the flange 77. The base-side rib 214 includes vertical ribs 216a, 216b, horizontal ribs 217a, 217b, 217b, and a ring-shaped rib 219.

The slope 213 of the outer base 195 serves to allow the flange 77 to be inserted smoothly into the slit 197 in cooperation with the slope 203 of the inner base 194. The ridges 212, 212 are formed on the outer base 195 to face and project toward the inner base 194. The ridges 212, 212 are supporting portions for preventing a backlash of the flange 77 in the vehicle width direction.

The grommet 192 is composed of an outer cylindrical part (housing part) 221 that passes through the through hole 201 of the inner base 194, and an inner cylindrical part (pin part) 222 fitted in the outer cylindrical part 221.

The outer cylindrical part 221 has a flange part 224 formed to be in contact with the inner base 194, an outer cylindrical body 225 passing through the through hole 201, and an expansion part 226 formed at an end of the outer cylindrical body 225 to be locked to a clip hole 169 (FIG. 14) of the recess 167. The expansion part 226 has a plurality of cuts 227 formed along a circumference direction, and a plurality of locking pieces 228 formed by the cuts 227. Each of the locking pieces 228 has a projection 229 (FIGS. 18, 19) formed on an inner surface adjacent to a tip end thereof.

Figure 18:
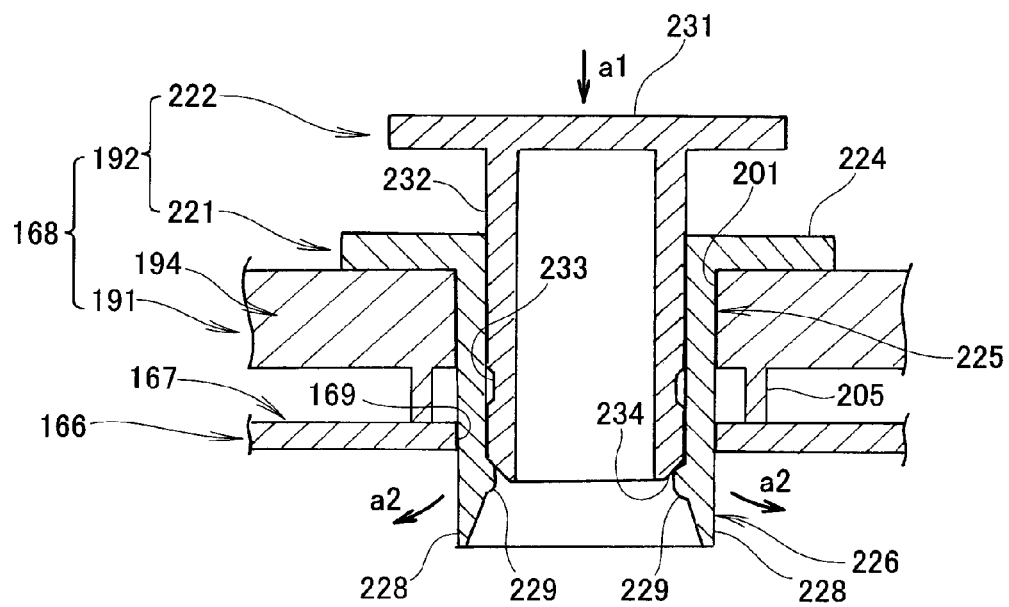
FIG. 18 is a cross-sectional view of a rivet shown in FIG. 14 in a non-locked state.
Figure 19:
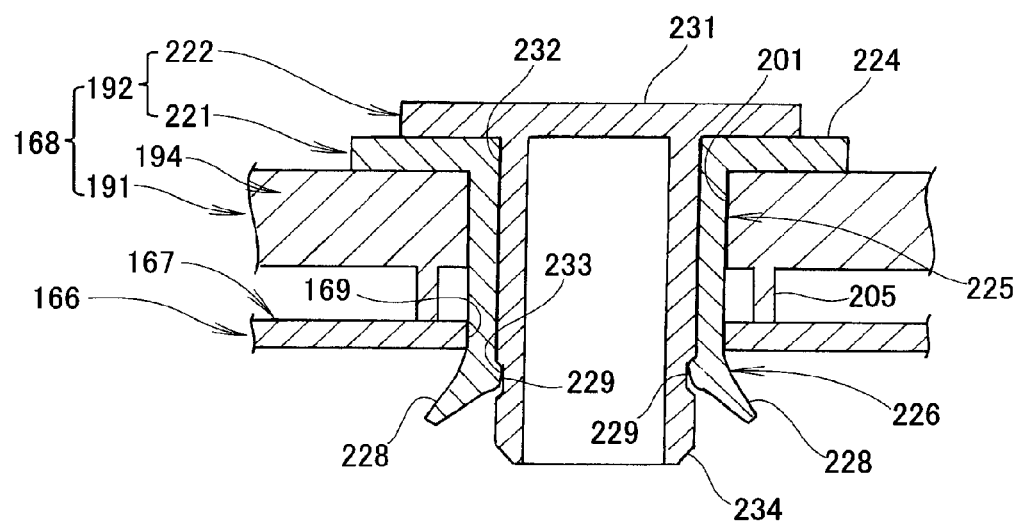
FIG. 19 is an enlarged view of section 19 of FIG. 14.

As shown in FIGS. 18 and 19, the inner cylindrical part 222 has a head 231 for pressing the inner cylindrical part 222, an inner cylindrical body 232 extending from the head 231, a locking groove 233 formed adjacent to a tip end of the inner cylindrical body 232, and a tapered edge 234 formed at the tip end of the inner cylindrical body 232.

In FIG. 18, the head 231 of the inner cylindrical part 222 is pressed as indicated by arrow a1. The projection 229 of the outer cylindrical part 221 is pushed by the tapered edge 234 of the inner cylindrical part 222 outward in a radial direction as indicated by arrows a2, a2. In this manner, the clip 168 is attached to the recess 167 of the outside panel 166, as shown in FIG. 19, with the grommet 192 is brought into a locked state out of a non-locked state.

Embodiment 3

Figure 20:
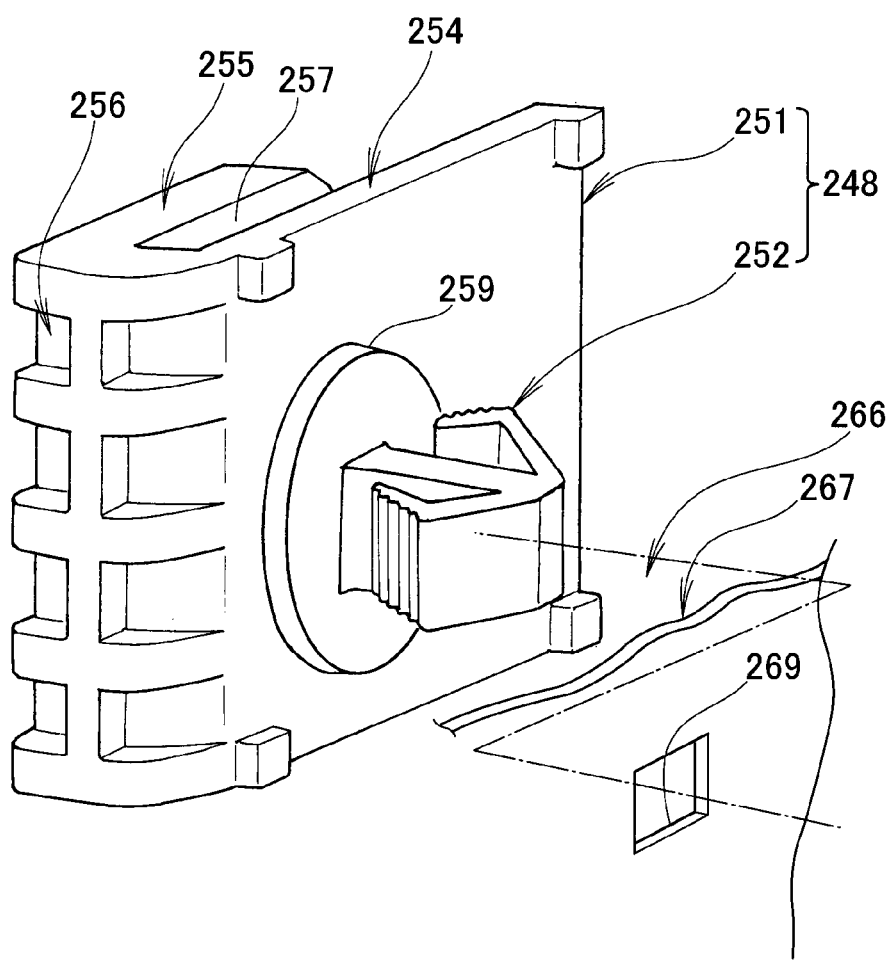
FIG. 20 is a perspective view of a clip according to a third embodiment of the present invention.

As shown in FIG. 20, a vehicle fender panel mounting structure according to the third embodiment includes a clip 248 having a clip body 251, and a locking claw 252 formed of resin integrally with the clip body 251 for attaching the clip body 251 to an outside panel 266.

The clip 248 has an inner base 254 located inward to face the outside panel 266, an outer base 255 located outward to face the fixed window 23 (FIG. 2), a connecting part 256 formed to connect the inner base 254 and the outer base 255, a substantially U-shaped slit 257 formed by the inner base 254 and the outer base 255, and the locking claw 252 for attachment with the outside panel 266.

The inner base 254, the outer base 255, the connecting part 256, and the slit 257 of the clip 248 have substantially the same configuration as those of the clip body 191 (FIG. 15) of the second embodiment. However, the inner base 254 has a locking claw base 259 formed in a circular shape, and the locking claw 252 formed on the locking claw base 259 to be attached with a recess 267 formed on the outside panel 266.

Note that the recess 267 of the outside panel 266 has a substantially rectangular clip hole 269 formed therein to be locked with the locking claw 252.

The clip 248 has the clip body 251 and the locking claw 252 which are integrally formed of resin, and is fixedly attached to the recess 267 of the outside panel 266 via the locking claw 252.

The clip 248 is formed in a substantially U shape opened forward of the vehicle, and having the slit 257 extending in the longitudinal direction of the vehicle body in a state of being attached. The flange 77 (FIG. 2) is detachably engaged with the slit 257, thereby fixing the protrusion 76 of the fender panel 22.

The vehicle fender panel mounting structure according to the present invention has been described above in relation to the cases where the clip 68 having the rivet 92 for attaching the clip body 91 to the outside panel 26 is used as shown in FIGS. 10 to 12 (Embodiment 1), where the clip 168 having the grommet 192 for attaching the clip body 191 to the outside panel 166 is used as shown in FIGS. 14 to 19 (Embodiment 2), and where the clip 248 having the clip body 251 and the locking claw 252 that are integrally formed of resin is used as shown in FIG. 20 (Embodiment 3). However, the present invention is not so limited, and aspects of these embodiments may be combined or modified as appropriate.

INDUSTRIAL APPLICABILITY

The vehicle fender panel mounting structure of the present invention is well suited for use in passenger vehicles such as sedan cars, wagon cars, etc.

REFERENCE CHARACTERS

10 . . . automobile (vehicle), 22 . . . fender panel, 22a . . . upper edge of the fender panel, 23 . . . triangular fixed window, 23a . . . inner surface of the fixed window, 26 . . . outside panel, 27 . . . outer surface of the outside panel, 31 . . . front pillar, 58 . . . opening edge (window frame), 63a . . . lower end of the front pillar (upper frame member), 67 . . . recess of the opening edge, 68 . . . clip, 76 . . . protrusion of the fender panel, 76a . . . side edge of the protrusion facing the fixed window, 76b . . . base of the protrusion, 77. . . flange, 81 . . . projection of the flange (engagement portion for engagement with the clip), 82 . . . reinforcing bead of the flange, 97 . . . slit of the clip, 111 . . . opening of the clip

The invention claimed is:

1. A vehicle fender panel mounting structure comprising:
   a triangular fixed window mounted between a lower part of a front pillar and an outside panel; and
   a fender panel covering an outer surface of the outside panel and having a protrusion formed at an upper edge thereof so as to cover a lower end of the front pillar,
   wherein the protrusion has a flange extending from a side edge thereof facing the fixed window toward and along an inner surface of the fixed window,
   wherein the fixed window has an opening edge provided with a clip having a slit formed at a position corresponding to the flange and extending in a longitudinal direction of a vehicle, and
   wherein the flange is detachably engaged with the slit of the clip to thereby lock the protrusion to the opening edge of the fixed window.

2. The vehicle fender panel mounting structure of claim 1, wherein the flange has a projection formed on an engagement part for engagement with the clip and projecting outward in a vehicle width direction, and the clip has an opening for engagement with the projection, whereby the projection of the flange and the opening of the clip are engaged with each other.

3. The vehicle fender panel mounting structure of claim 1, wherein the opening edge of the fixed window has a recess formed on a front part thereof to bulge inward in a vehicle width direction at a position facing the inner surface of the fixed window, and the clip is fitted into the recess so that the flange is engaged with the clip.

4. The vehicle fender panel mounting structure of claim 1, wherein the flange has a reinforcing bead formed thereon adjacent to a base of the protrusion.

* * * * *